Patented Apr. 20, 1943

2,317,328

UNITED STATES PATENT OFFICE 2,317,328

COATED CORK COMPOSITION

Paul W. Kinney, Lancaster, Pa., assignor to Armstrong Cork Company, Lancaster, Pa., a corporation of Pennsylvania No Drawing. Application September 17, 1940, Serial No. 357,113

8 Claims. (Cl. 117—148)

This invention relates to cork masses bearing improved adhesive layers.

It is an object of the invention to provide cork masses with adhesive layers having improved bonding characteristics with respect to the cork masses.

It is a further object to provide adhesive layers having improved adhesion with respect to cork masses having an unctuous surface film of wax or oil, such as is ordinarily produced in extrusion processes employed in making cork compositions.

It is a further object to provide cork compositions with adhesive layers which are unaffected by contact with aldehydes, such as may be present as insolubilizers for the binders in such cork compositions.

It is a further object to provide cork compositions with adhesives which may be applied thereto and then allowed to dry thereon and which will remain water-soluble and readily activatable by water in spite of being in contact with cork compositions containing aldehydes through long periods of time, and at the same time will not flow off the cork compositions even though storage may be under conditions of high temperature and high humidity.

It is a further object to provide cork composition roll coverings carrying a layer of such an adhesive on the internal surface thereof.

The adhesive hereinafter described may be applied to cork masses of any character, whether sheets or blocks of natural cork or of cork compositions of any shape, and may be used to fasten the cork masses to a surface of metal, glass, synthetic resin, cork, cardboard, paper or any other suitable material.

The adhesive hereinafter described has been found especially suitable to fasten textile roll and friction roll coverings of composition cork to mandrels of cast iron, steel, etc. Gelatin and gum arabic have been in common use for this purpose, but the gelatin becomes insoluble in water when the adhesive layer remains in contact for a long time with the cork composition which is commonly formed with a binder containing an aldehyde. Since it is common practice to coat the inside of the roll covering, such as is used for a cot, temple roll, or any friction roll, with the adhesive layer, then to allow the adhesive layer to dry, and then to ship the coated roll covering to the factory where it is dipped into water momentarily and finally mounted upon a mandrel, wheel or other suitable device, the insolubilization of the gelatin which occurs during long periods of storage prior to the mounting of the roll covering prevents the adhesive layer from being activated by a quick immersion in water. The gum arabic has the disadvantage that it is so brittle that it is flaked out whenever the roll covering is flexed. The flaking is aggravated by the fact that gum arabic has poor adhesion with the waxy surface of such cork composition coverings as are produced by extrusion. The gum arabic has been modified by the addition of a plasticizer in attempting to avoid this brittleness, but in this case, the plasticizers used, e. g. glycerine or glycols, are so hygroscopic that when roll coverings coated with such adhesives are stored under conditions of high humidity and temperature for any considerable time, the adhesive flows out of the roll covering.

It has now been found that polyacrylic acid or its water-soluble salts, especially its alkali-metal salts, may be used in this relationship without encountering the disadvantages of the previously used adhesives. Polyacrylic acid or one of its salts is applied to the cork composition roll covering in the form of a film of suitable thickness, which dries rapidly to form a superficial coating which adheres to the waxy surface of the composition cork. The coated composition can be stored at high temperature and high humidity, such as 100° F. and 80% relative humidity, for a considerable time without running of the film off the surface of the cork composition. The dried film is highly resistant to flaking when the composition is flexed, and is also readily activated by a short immersion in cold water to form a film which acts as a lubricant so the roll covering can be slid upon the mandrel or other core with facility. Rapid activation in cold water is important since immersion in water for a long time tends to alter the pliability of the roll covering by leaching out plasticizers, such as glycerine. After the assembly of the roll covering upon the mandrel, the adhesive film dries to produce a strong bond between the cork and the mandrel.

The polyacrylic acid or one of its salts may be used alone, or any one of these may be used with up to an equal part by weight or with an even higher proportion of other water-soluble adhesive materials, such as dextrines, starches, or water-soluble natural gums, e. g. gum arabic, gum tragacanth, karaya gum, locust bean gum, etc. Such additions in amounts which do not appreciably change the characteristics of the polyacrylic acid as described above serve to increase the viscosity and solids content to assist in the application of the water solution of the adhesive to form a film of suitable thickness upon the cork composition. Similarly, pulverized inert fillers (i. e., those not affected by the acid nature of the polyacrylic acid) such as clay, diatomaceous earth, sand, or silica may be added for the same purpose. The proportion of these inert fillers may be up to about one-half part by weight per one part of polyacrylic acid. In addition, a wetting agent, such as one of the sulfates of straight and branched chain higher alcohols, or Santomerse, or one of the sulfo-succinic acid esters, may be used in proportions of about 0.5% of the total solution. The function of the wetting agent is to assist the penetration of the cork composition by the adhesive solution.

The adhesive of this invention may be applied in conjunction with any type of cork composition whether formed with the natural binder present in the cork particles and exuded by baking them or with any other binder, such as any one of the resinous materials including rubber, cyclized rubber, chlorinated rubber, rubber hydrochloride, polyisoprene, polyisobutylene, polybutylene, polychloroprene, combined rubber and hydraulic cement, Thiokols, such as the polyolefine sulfides and polysulfides, polyvinyl chloride, copolymers of vinyl chloride and vinyl acetate, polystyrenes, polyacrylic acid esters, cellulose esters or ethers, linoxyn, and alkyd resins, all of which binders may or may not be combined with plasticizers, such as glycerine, glycols, Carbitols, Cellosolves, and diesters of phthalic acid, e. g. dibutyl phthalate. It is particularly useful with cork compositions having as a binder thereof resins formed with an aldehyde or proteins combined with an aldehyde, such as urea-aldehyde, phenol-aldehyde, mixed urea-aldehyde and phenol-aldehyde resins, as well as aldehyde-hardened polyvinyl alcohol and aldehyde-hardened proteins including gelatin, glue, casein, soya-bean protein, albumen, and prolamines, e. g. zein, any of which may or may not be plasticized with glycerine, glycols, etc.

The following examples are illustrative of the invention:

Example 1

A solution in water of polyacrylic acid having a concentration of 20% was applied to the inside peripheral surface of an extruded formaldehyde-insolubilized glue-glycerine cork composition cot. After the adhesive dried, the cot was immersed in water and immediately mounted upon a mandrel.

Example 2

An adhesive composition was made by adding three parts by weight of diatomaceous earth to fifty parts by weight of a 20% solution in water of polyacrylic acid. The adhesive was applied to a cork composition sheet made with a phenol-aldehyde resin binder.

Example 3

An adhesive was made by adding two parts by weight of raw corn starch to fifty parts by weight of a 20% water solution of the sodium salt of polyacrylic acid and then heating the mixture to 190° F. to disperse the starch. One-fourth part of Santomerse was added to the cooled dispersion. The adhesive was then applied to a textile cot made of a cork composition having a formaldehyde-hardened glue-glycerine binder and allowed to dry. The coated cot was stored for a considerable time and was then mounted by dipping the cot into cold water and sliding it upon a cast-iron mandrel of suitable size.

Example 4

An adhesive was made by adding ten parts by weight of dextrine to fifty parts by weight of a 20% solution of the sodium salt of polyacrylic acid, and it was applied to a sheet of an urea-aldehyde resin bonded cork composition. The adhesive was allowed to dry, and at the time of use, it was activated by dipping quickly into cold water, whereupon the composition was mounted upon a cork surface.

Example 5

An adhesive was made by adding five parts by weight of clay and five parts of dextrine to fifty parts of a 20% solution of polyacrylic acid. This adhesive was applied to a sheet of cork and allowed to dry.

In this specification and claims, the term "water-soluble" is used to describe not only those substances which dissolve in water to form a true solution, but also those which form colloidal solutions in water.

The invention is not limited to the specific examples or preferred proportions recited above, which have been given for illustrative purposes, but may be otherwise embodied or practiced within the scope of the following claims.

I claim:

1. An article of manufacture comprising a cork composition including an aldehyde containing binder which liberates free aldehyde, said cork composition bearing on at least one surface thereof a dried water-soluble coating of a water-soluble polyacrylic resin which is unaffected by said free aldehyde.

2. An article of manufacture comprising a cork composition having a waxy surface bearing on at least one surface thereof a dried water-soluble coating of a water-soluble polyacrylic resin.

3. An article of manufacture comprising a body of cork granules, bound together with a binder, a film of wax on one surface of said body, and a dried coating of a latently adhesive material consisting of a water-soluble polyacrylic resin and adapted to be activated by short immersion in cold water, bonded to said wax film and effective when activated for firmly bonding the body to a surface to be joined.

4. An article of manufacture as claimed in claim 1 in which said water-soluble polyacrylic resin is a sodium salt of polyacrylic acid.

5. An article of manufacture as claimed in claim 2 in which said water-soluble polyacrylic resin is a sodium salt of polyacrylic acid.

6. An article of manufacture comprising a body of cork granules bound together with an aldehyde insolubilized binder which liberates free aldehyde, and a dried coating of a latently adhesive material, consisting of a water-soluble polyacrylic resin and adapted to be activated by short immersion in water, bonded to one surface of said body.

7. An article of manufacture comprising a cork composition having an unctuous surface film bearing on at least one surface thereof a dried water-soluble coating consisting of a water soluble polyacrylic resin.

8. An article of manufacture comprising a cork composition including an aldehyde insolubilized binder which liberates free aldehyde, said cork composition bearing on at least one surface thereof, a dried adhesive coating of a mixture of a water-soluble polyacrylic resin with an additional water-soluble adhesive substance, said additional adhesive being in an amount which does not appreciably change the characteristics of said polyacrylic resin and of such a character that said mixture is not insolubilized by said free aldehyde.

PAUL W. KINNEY.